Aug. 12, 1947.  J. G. TULLIS  2,425,656
CONVEYOR MOUNTING FOR TRUCKS
Filed Nov. 9, 1944  3 Sheets-Sheet 1

INVENTOR.
JASPER G. TULLIS
BY
ATTORNEY

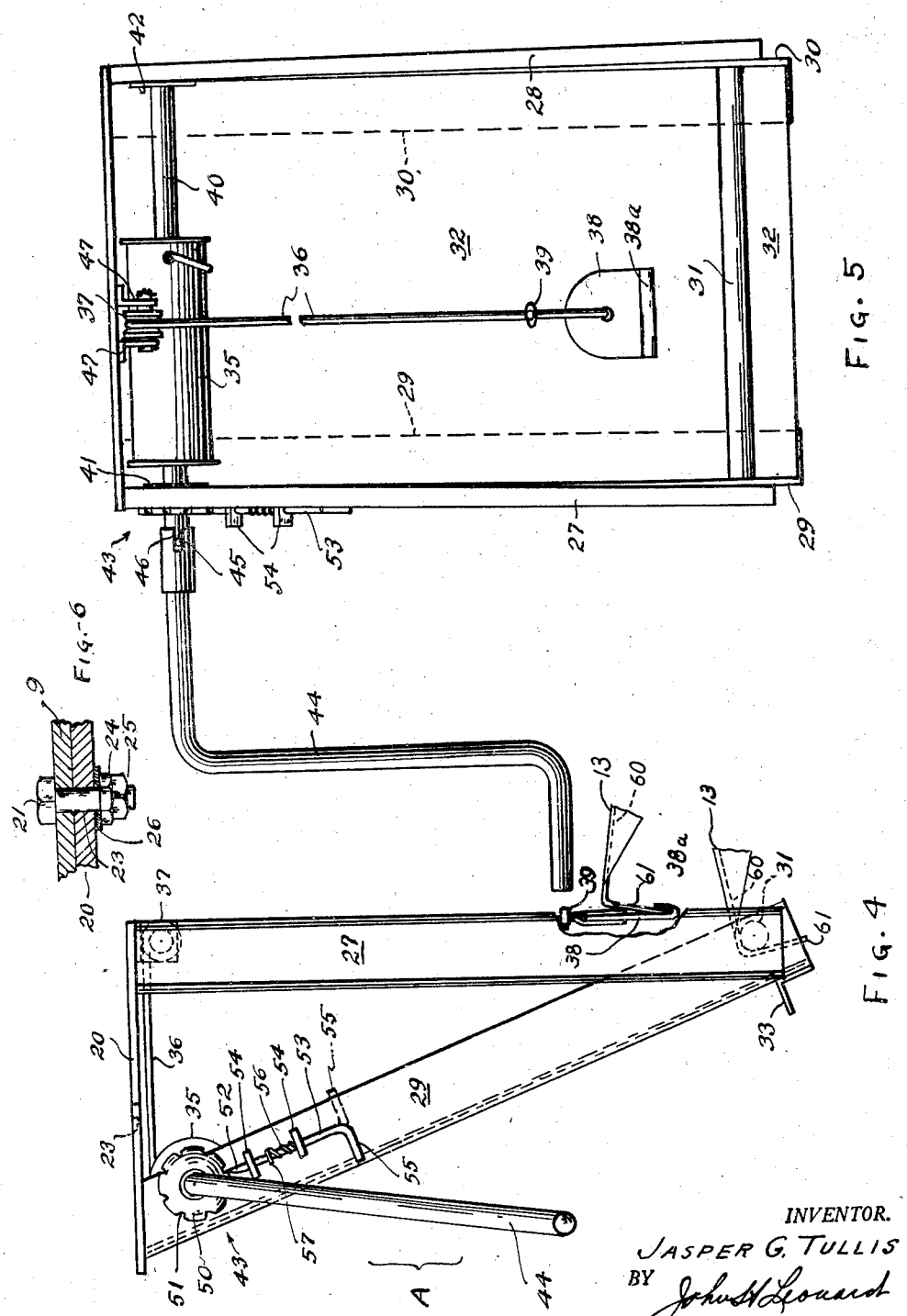

Patented Aug. 12, 1947

2,425,656

UNITED STATES PATENT OFFICE 2,425,656

CONVEYOR MOUNTING FOR TRUCKS

Jasper G. Tullis, Cleveland, Ohio, assignor to The Cleveland Formgrader Company, Cleveland, Ohio, a corporation of Ohio Application November 9, 1944, Serial No. 562,716

10 Claims. (Cl. 224—29)

This invention relates to an improvement in means for loading and carrying on a motor vehicle a load handling mechanism such as an elongated, power driven, portable conveyor unit for bulk material such as coal, crushed stone, slag or the like, which unit is adapted to be employed to move such bulk material from the body of the vehicle to a remote point. The above indicates the general object of the invention.

A further object is to provide a hand operated winch mechanism adapted for quickly loading an elongated unit such as a portable conveyor into a side carrying position on a truck so that neither the winch mechanism nor the load projects laterally or otherwise interferes with safe driving of the truck.

A specific object is to provide a side carrier mechanism operable to lift and support for transportation any desired distance the heavier end of a power driven conveyor unit so that the lighter opposite end of the unit may be comparatively easily swung and lifted bodily to a suitable carrier or cradle at the opposite end of the vehicle.

Still another object is to provide a crank operated winch mechanism as a side carrier and hoist for a dump truck, which mechanism although underhanging the dump body of the truck, will enable operation at good mechanical advantage and quickly without interfering between the crank and dump body.

A further object is to provide a side hoisting and carrying mechanism for a truck arranged as a depending support for one end of, for example, a long conveyor unit, the parts and supporting means of which mechanism are capable of stably supporting the unit, i. e. against pitching or swinging or being bounced off the support.

A further object is to provide a carrier bracket for one end of an elongated portable conveyor unit having an improved means for safely securing the unit in riding position without the use of hold-down chains or other timestaking fastening means for transportation of the unit any desired distance.

A further object is to provide a winch mechanism for purposes such as indicated above having a releasable self-locking ratchet mechanism of reversible character.

Other objects and advantages of the invention will become apparent from the following description of the preferred form shown in the drawings in which Fig. 1 is a fragmentary side elevation showing, in outline, portions of an automobile truck with a dump body, the pivoted winch bracket and forward carrier bracket being shown carrying a typical conveyor for coal or the like;

Fig. 4 is a relatively enlarged side elevation of the winch bracket;

Fig. 5 is a front view of the same; and

Fig. 6 is a detail vertical cross sectional view showing a suitable form of pivot for the winch bracket.

Figure 1:
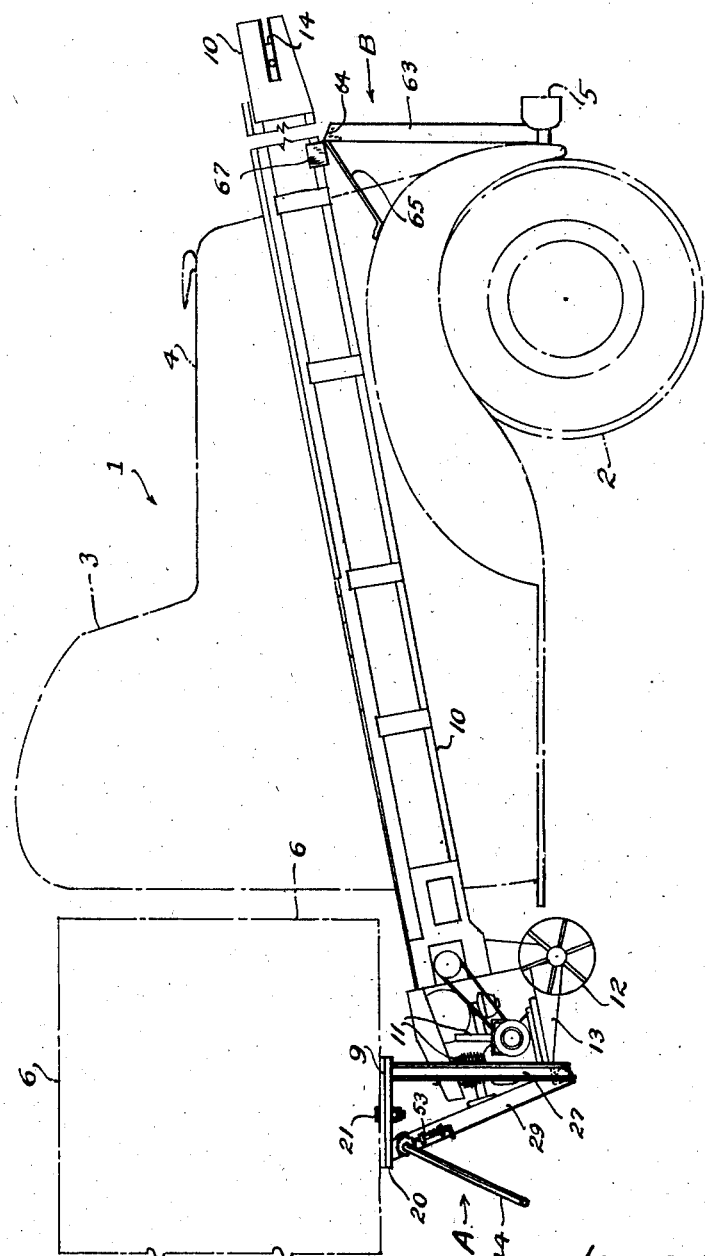
Figure 2:
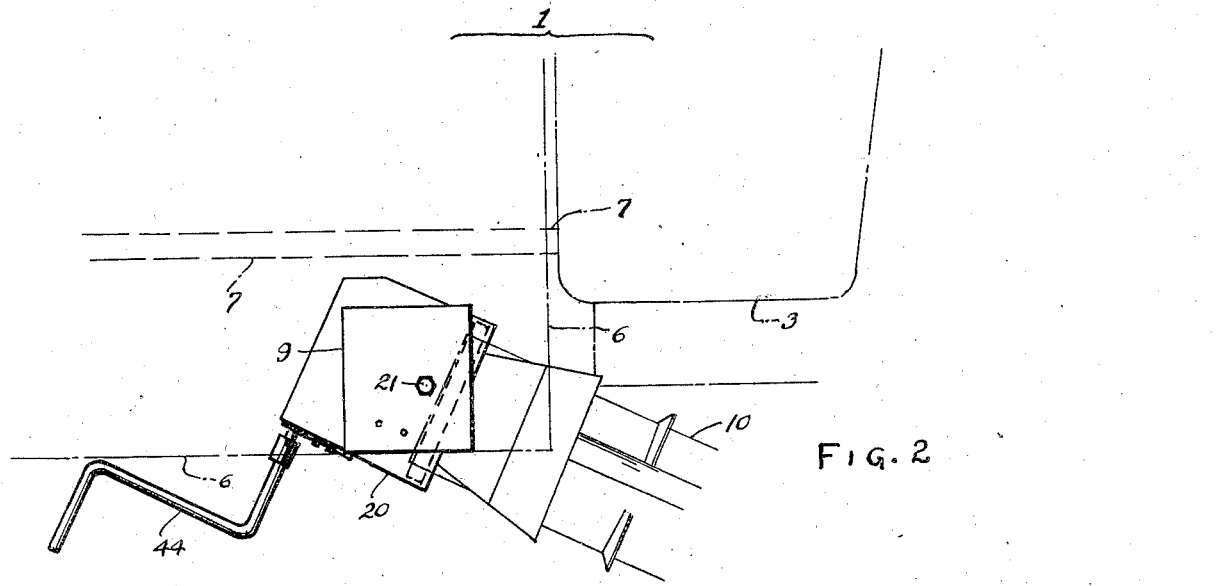
Fig. 2 is a plan view of the winch bracket, adjacent portions of the truck and body being shown in broken lines.
Figure 3:
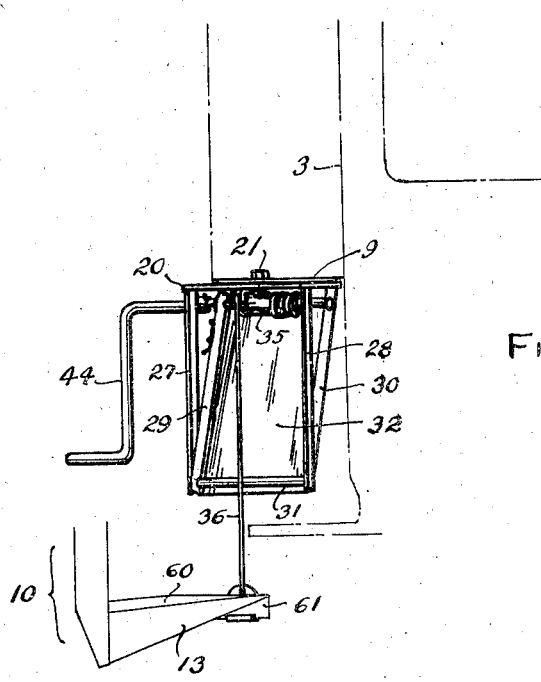
Fig. 3 is a perspective view of the winch bracket and a rear portion only of the conveyor, said view looking rearwardly along the vehicle and showing the bracket swung to load pick-up or depositing position with reference to the vehicle.

Referring particularly to Figs. 1 to 3, a forward portion of a highway vehicle of a common type (dump body truck) is shown in outline or diagrammatically at 1. The vehicle parts so shown include a front wheel 2, cab 3, motor hood 4 and bumper 5. The main load carrying dump body 6 of the truck may be constructed as usual and mounted on the chassis by suitable means, not shown, enabling the load to be dumped out at the rear. The bottom wall of the dump body 6, at one side, has secured thereto, for the purpose of supporting the winch bracket mechanism hereof, a fairly heavy metal plate 9. The body 6 projects laterally beyond the adjacent supporting frame at both sides, as is usual in coal trucks, a portion of the right hand frame sill of the truck being indicated at 7 in Fig. 2. The overhang provides adequate space for the entire winch mechanism without having the latter project materially beyond the body 6 in any turned position of the mechanism.

The conveyor or truck unloaded is shown in outline at 10, being somewhat foreshortened by omitting part of the forward end of the conveyor frame. The particular conveyor mechanism has its own power plane 11 carried on a main motor mounting plate 13 of wide channel form. The motor mount carries a suitable axle for a pair of wheels, one of which is shown at 12 so that the conveyor, when dismounted from the truck, may be wheeled about by one person supporting the lighter end of the conveyor. When the mechanisms hereof are designed for use on the usual coal truck, one person can easily handle the forward end of the conveyor to lift it and to wheel the conveyor from place to place since in the usual proportions the entire weight of the conveyor does not exceed three hundred and fifty pounds and the forward end usually weighs much less than one hundred pounds.

The motor 11 of the conveyor is arranged to drive an endless belt, not shown, looped at one end about a roller driven by the motor mechanism and at the opposite end on a similar roller partially shown at 14 in Fig. 1.

The winch bracket A hereof shown at the left in Fig. 1 has a rigid metal top plate 20 pivotally secured as on a vertical bolt or stud 21 to the heavy plate 9 on the under side of the dump body 6. The two plates 20 and 9 and the securing bolt function as a fifth wheel construction. The bracket A in normal conveyor-carrying position is wholly beneath the body as will be apparent from comparison of Figs. 2 and 3. The bolt 21 as shown in Fig. 6 may be welded to the plate 9 at the shank 22 of the bolt. The shank turns snugly in a bearing opening 23 of the plate 20. The upper one of a pair of nuts 24 and 25, jammed together and thereby locked, supports the plate 20 in sliding contact with the plate 9. A suitable bearing washer is shown at 26 beneath the plate 20.

Secured, as by welding, to the top plate 20 of the winch bracket are four depending structural frame members interconnected at their lower ends. The forward pair of frame members, channels indicated at 27 and 28, extend vertically from the forward edge of the plate 20 and the rear pair, shown as angles 29 and 30, extend obliquely forwardly from the position of attachment to the plate 20 so that the lower ends of the angles 29 and 30 are brought into overlapping relation to the lower ends of the channels 27 and 28. Said lower ends of the members 27 to 30 are secured together by a rigid cross member 31 which is preferably tubular. The ends of the tube may for instance be welded respectively into aligned openings in the members 27 and 29 at one side of the frame and in the members 28 and 30 at the other side. At the rear of the bracket and between the members 29 and 30 is an apron plate 32 extending as shown from the plate 20 to the lower extremities of the members 29 and 30. The lower rear margin of the apron is reinforced with a cross brace 33, see Fig. 4, attached to the rear flanges of both members 29 and 30 and, optionally, to the apron plate 32 as well. The lower marginal portion of the apron cooperates with the tubular cross piece 31 and the vertically disposed side flanges of the structural members 29 and 30 to form a downwardly converging receiving pocket for a flange portion of the motor mount 13 of the conveyor 10 as will be apparent from comparison of Figs. 4 and 5.

While the various bracket members above described are preferably welded together they can be secured to each other in any other suitable manner, for instance by bolts or rivets and appropriate attaching connectors.

The winch mechanism on the bracket A comprises a drum 35 to which a cable 36 is secured, the cable passing forwardly from the drum over a supporting sheave 37 and then downwardly to a sheet metal hook 38 suitably attached to the cable. The support for the drum is a substantially rigid shaft or tube 40 journalled in bearing plate members 41 and 42 rigidly connected respectively to the members 29 and 30. The drum may be of conventional construction and is fastened to the shaft so as always to turn therewith. The shaft 40 projects to one side of the bracket A through a ratchet mechanism indicated generally at 43 and the projecting end of the shaft is designed demountably to receive a hand crank 44. The detachable connection may, for example, comprise a cross pin 45 on the shaft 40 arranged to be engaged by parallel open slots in the crank, one of which is shown at 46, Fig. 5. The crank is only attached to the shaft when it is desired to operate the drum, being ordinarily carried in the truck. The support for the cable guide sheave 37 may be carried on the forward portion of the plate 30 as in depending bracket or bearing members 47, Fig. 5.

Referring further to the ratchet mechanism 43, the same comprises, as shown, a wheel 50 secured rigidly to the shaft 40 against turning thereon, said wheel having a series of uniformly spaced notches 51 converging radially inwardly toward the axis of the wheel for engagement by the nose portion 52 of a sliding pawl, shown in the form of a pin 53, carried by a pair of ears 54 on the side of the angle member 29. A coil spring 56 around the pin between the lower ear 54 and a fixed shoulder 57 on the pawl urges the pawl toward the ratchet wheel. The pin is turnably mounted in the ears 54 so as to present the nose portion 52 to the notches 51 in respective reversed positions when a tail portion 55 of the pawl is swung to the two positions indicated. When the tail portion is in the full line illustrated position, the nose portion 52 of the pawl then enables the drum to turn freely in a counterclockwise direction (Fig. 4) such as will take in the cable 36 and the ratchet then automatically holds the cable against being paid out. When the tail piece 55 of the pawl is swung into the position shown in broken lines then the nose portion of the pawl is reversed with reference to the notches 51 and the pawl acts as a ratchet pawl in enabling clockwise rotation of the drum but automatically preventing counterclockwise rotation. The advantage of the reversible pawl and ratchet arrangement will be brought out later herein.

Referring further to the conveyor or truck unloader 10, Figs. 1, 2 and 3, the horizontal web 60 of the generally channel-shaped member 13 forming the sill of the motor mount is extended rearwardly beyond the motor mechanism and provided with a depending flange 61 at the rear end. The flange extends substantially across the entire rear edge of the web 60. The cable-supported member 38 has its hook portion 38a substantially complementary to the flange 61 or so as snugly to receive the flange, thereby to lift the relatively heavy motor-mechanism-supporting end of the conveyor by means of the cable and winch when the drum is turned in the proper direction.

The flange 61 of the motor mount 13 is shown in partially raised position in full lines in Fig. 4 suspended by the hook and cable. The carrying position of the motor mount on the bracket mechanism A hereof is indicated in broken lines in Fig. 4 and it will be noted that the flange 61 has been swung as by endwise rearward bodily movement of the conveyor so that a rear portion of the web rests on the tubular cross member 31 with the flange disposed in the receiving pocket formed between said member and the apron 32. Thus endwise movement of the conveyor in carrying position is limited to a small amount by the apron and cross bar. The horizontal length of the flange 61 is such that the conveyor has also very little side play. The flange 61 is of sufficient length vertically so that, in transit, the conveyor is not likely to become jolted out of place on the carrier bracket.

At the forward end of the vehicle, as shown in Fig. 1, a suitable bracket B is erected as on the supporting bars of the bumper 5. The bracket B may comprise a pair of upright structurally flanged members, one of which is shown at 63, a top cross member 64 secured to the uprights and diagonal braces, one of which is indicated at 65. The rear ends of the braces may be attached to the adjacent fender or some other convenient point.

It will be noted that in the supported position of the motor mount member 13 the flange 61 underhangs the cross bar 31 due to elevation of the front end of the conveyor so that the rear end of the conveyor may be locked by said flange against being bounced out of supported position on the bracket A. Rearward bodily movement of the conveyor may be prevented by the provision of a suitable abutment, not shown, between the conveyor frame and the bracket B. Such a lug could be provided similarly to the lug 67 of Fig. 1 which latter lug, as well as does the flange 61, tends to prevent forward jolting movement of the conveyor.

In order to remove the conveyor 10 from the carrying position of it shown by Fig. 1 the forward end of the conveyor is picked up by hand and swung about the pivot pin 21 of the bracket mechanism A as for example to the swung position of the conveyor with reference to the truck 1, shown on Figs. 2 and 3, and the forward end set down on suitable legs or props (not shown) or directly on the ground. Thereupon the crank 44 is slipped over the projecting end of the shaft 40 and the rear end of the conveyor lifted by the winch until the web and flange 60, 61 are in approximately the full line illustrated position shown in Fig. 4. The conveyor is then moved lengthwise of itself forwardly of the truck to disalign the flange 61 and the cross bar 31. Thereupon the ratchet 53 is reversed as to the broken line indicated position of the tail piece 55 or maintained as by one hand of the operator in position to release the ratchet wheel 50, and the cable paid out gradually by means of the crank to lower the wheels 12 of the conveyor to the ground. It will be noted that in the horizontally swung position of the conveyor 10 according to Fig. 2, which is ample to allow the forward end of the conveyor to be set down, the crank clears the adjacent side of the body 7 a sufficient distance to enable the continued rotation of the crank in lifting or lowering the conveyor without interference with the truck body.

After the conveyor has been used to remove the load from the dump body, the conveyor is remounted on the bracket with the bracket in the same horizontally swung position as before (Figs. 2 and 3); and the hook 38 reconnected with the flange 61 of the motor mount. Thereupon the ratchet pawl is positioned as illustrated in full lines allowing the crank to be turned in the counterclockwise direction as viewed in Fig. 4 to enable hoisting of the conveyor to carrying position. After the motor mount 13 has been moved approximately to the position shown in full lines in Fig. 4 the conveyor is moved bodily rearwardly, as by hand, unit the flange 61 will again pass into the converging pocket behind the supporting bar 31 as the winch cable is paid out by a clockwise rotation of the crank. The hook 38 remains in hooked position on the flange 61, being held in that position by the ratchet pawl in readiness for re-dismounting of the conveyor.

It will be seen that when the forward end of the conveyor 10 is swung to carrying position on the bracket B, all portions of the bracket A are then beneath the truck body 6 and that the conveyor itself does not project beyond the lateral limits of said body. While the operating clearance for the crank in the particular relationship of the bracket A and truck body 6 is only afforded in the swung position of the conveyor shown by Fig. 2, or with the forward end of the conveyor moved between that position and the carrying position, the arrangement nevertheless enables the conveyor to be supported at its rear end while swung any desired distance from the front toward the rear through at least 90°. The advantage is that sometimes it is desired to suspend the rear end of the conveyor as on the hook 38 in a swung position of the conveyor considerably rearwardly from that illustrated by Fig. 2. While the crank could not be moved through a complete rotation in thus temporarily suspending the rear end of the conveyor it can, when necessary, be moved as by attachment and re-attachment of the crank in different turned positions on the shaft 40 to positions so as to lift the rear end of the conveyor a sufficient amount to suspend said end off the ground. After the conveyor has been swung forwardly approximately to the position shown by Fig. 2, it can then be further hoisted by full rotations of the crank and fully seated into carrying position.

I claim:

1. A side carrier for supporting one end of an elongated loader on a vehicle, comprising a bracket, hoisting means thereon operable, when the bracket is in operating position on the vehicle, to lift and support said end of the loader free of the bracket and in position for movement of the loader bodily relative to the bracket selectively to deposit the said end in a carrying position on the bracket and to remove said end of the loader from the bracket, and means constituting a substantially vertical pivot arranged to support the bracket in said operating position wherein the bracket is in dependent relation to the vehicle and for swinging movement in a horizontal plane from a loading position to a carrying position when the bracket is supported in said operating position.

2. In a carrier for one end of an elongated loader which loader has a hook at one end, said carrier being adapted to be mounted in depending position on a supporting vehicle, means constituting an upwardly open guide in fixed position relative to the carrier and operable for receiving the hook and supporting said end thereby, and hoisting mechanism on the carrier arranged selectively to pick up and lower said one end of the elongated loader and to support the said end of the loader for movement bodily relative to the carrier into position for engaging the hook with the guide and for removing it from the guide.

3. In a carrier for one end of an elongated loader which loader has a hook at one end, said carrier being adapted to be mounted in depending position on a supporting vehicle and comprising structural members forming a triangular frame with spaced apart sides for receiving the hook between them, and means connecting the sides and forming therewith a hook receiving guide which is open upwardly for receiving the hook, and hoisting mechanism on the carrier arranged selectively to pick up and lower said one end of the elongated loader for lowering the hook into and removing it from the guide.

4. In a carrier for one end of an elongated loader which loader has a depending hook at said end, said carrier being adapted to be mounted for horizontal swinging movement on a supporting vehicle, means constituting an upwardly open guide for receiving the hook downwardly, and hoisting mechanism on the carrier arranged to pick up the said end of the elongated loader and operable to support said end of the loader for movement of the loader bodily relatively toward and away from the carrier, and operable to lower the hook into and to remove it from the guide.

5. As part of a side carrier for an elongated load, a bracket having a top plate and two sets of downwardly converging side frame members, means interconnecting the sets of frame members in spaced relationship, a plate connecting two of the members and extending downwardly toward the point of convergence of the members and a cross bar connecting members of both sets and adapted to support one end of such elongated load in carrying position, said cross bar forming with the downwardly extending plate and side frame members an upwardly open receiving and positioning guide for a depending end part of such elongated load.

6. In combination with an auto truck and body of the class described, a depending bracket on the body substantially in laterally non-projecting relation thereto and swingable in a generally horizontal plane, and a hoist on the bracket for detachably engaging and moving bodily one end of an elongated loader into carrying position on the bracket.

7. In combination with an auto truck and body of the class described, a depending bracket on the body swingable in a substantially horizontal plane, a hoist on the bracket for moving one end of an elongated load into carrying position on the bracket, and a rack on the truck for supporting the opposite end of the elongated load in carrying position.

8. A side carrier for supporting an end of an elongated loader on a supporting vehicle having a body and comprising a bracket, pivot means connected thereto and adapted to be secured to the body and operative, when so secured, to support the bracket in dependent relation to the body for swinging movement about an upright axis, a support on the bracket adapted to receive and detachably support an end of the loader, hoist mechanism on the bracket and movable therewith, and including means detachably engageable with said end of the loader for hoisting said end of the loader and operable to support said end for bodily movement into and out of engagement with the support.

9. In combination, a vehicle having a body, a bracket, upright pivot means connecting the bracket to the vehicle and supporting the bracket in dependent relation to the body and for swinging movement about an upright axis, a support on the bracket adapted to receive and detachably support an end of an elongated loader, hoist mechanism on the bracket and movable therewith and including means detachably engageable with said end of the loader for hoisting said end and operable to support said end for bodily movement into and out of engagement with the support, and additional means on the vehicle engageable with said loader at a portion spaced from said end and operable for detachably supporting said loader at said portion when said end is engaged with said support.

10. A part of a side carrier for an elongated loader, a bracket including a top plate adapted to be supported in depending relation to a vehicle body and operable when so supported to swing about an upright axis, two sets of side frame members connected to the top plate and depending therefrom, a cross bar connecting the sets of members at a location spaced below the top plate and adapted to support detachably one end of said loader in carrying position, and a plate connecting members of said sets and extending downwardly toward the cross bar and defining therewith and with the side frame members an upwardly open receiving and positioning guide for said end of the loader.

JASPER G. TULLIS.

REFERENCES CITED

The following references are of record in the file of this patent:

UNITED STATES PATENTS

| Number | Name | Date |
| --- | --- | --- |
| 1,296,615 | Bly | Mar. 11, 1919 |
| 1,403,084 | James | Jan. 10, 1922 |
| 1,441,595 | Miller | Jan. 9, 1923 |
| 1,500,225 | Bornshein | July 8, 1924 |
| 1,544,477 | Palotce | June 30, 1925 |
| 1,626,122 | Smith | Apr. 26, 1927 |
| 2,056,875 | Wheeler | Oct. 6, 1936 |
| 2,093,300 | Adams et al | Sept. 14, 1937 |
| 2,321,549 | Holmes | June 8, 1943 |

FOREIGN PATENTS

| Number | Country | Date |
| --- | --- | --- |
| 670,577 | Germany | Jan. 20, 1939 |